Oct. 12, 1948.   J. F. G. HICKS ET AL   2,451,086
APPARATUS FOR MELTING AND CASTING GLASS
Original Filed Dec. 5, 1941   4 Sheets-Sheet 1
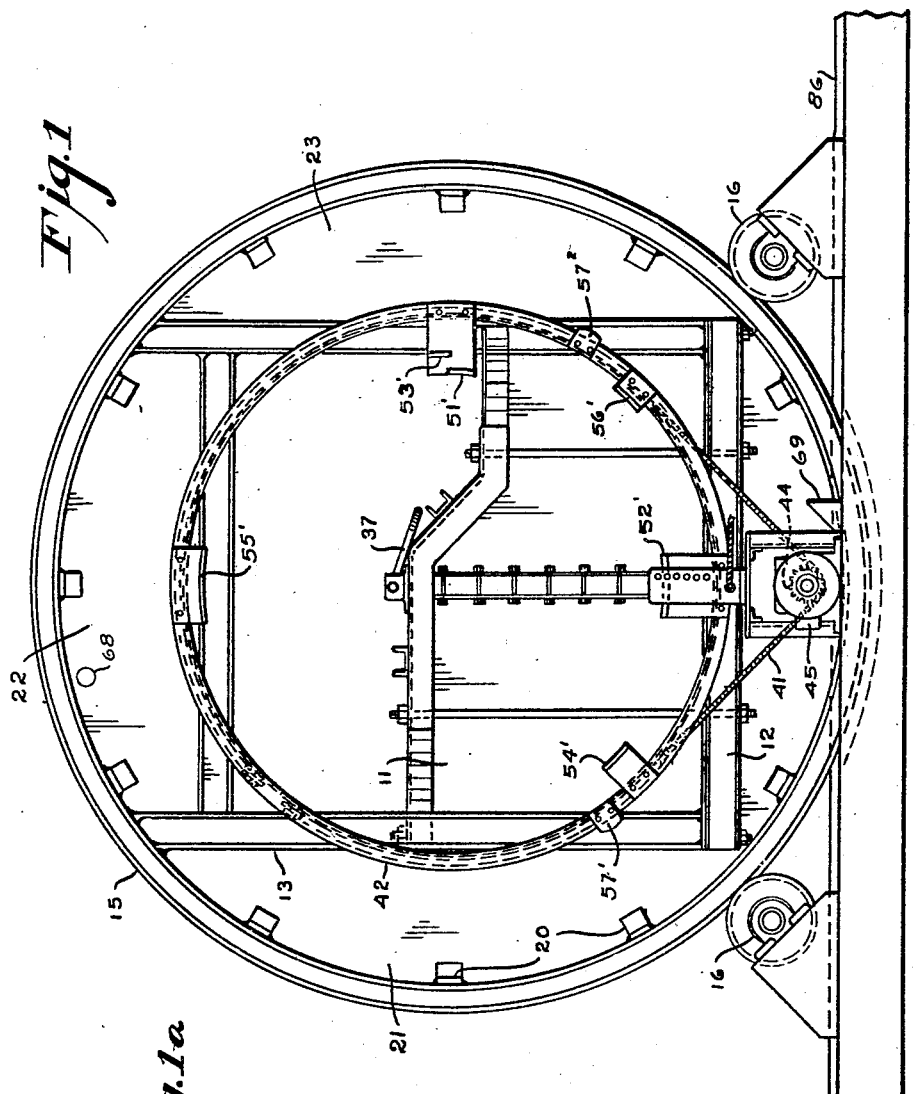
Inventors
John F. G. Hicks
and Carl F. Henkel
By J. H. Knight
Attorney

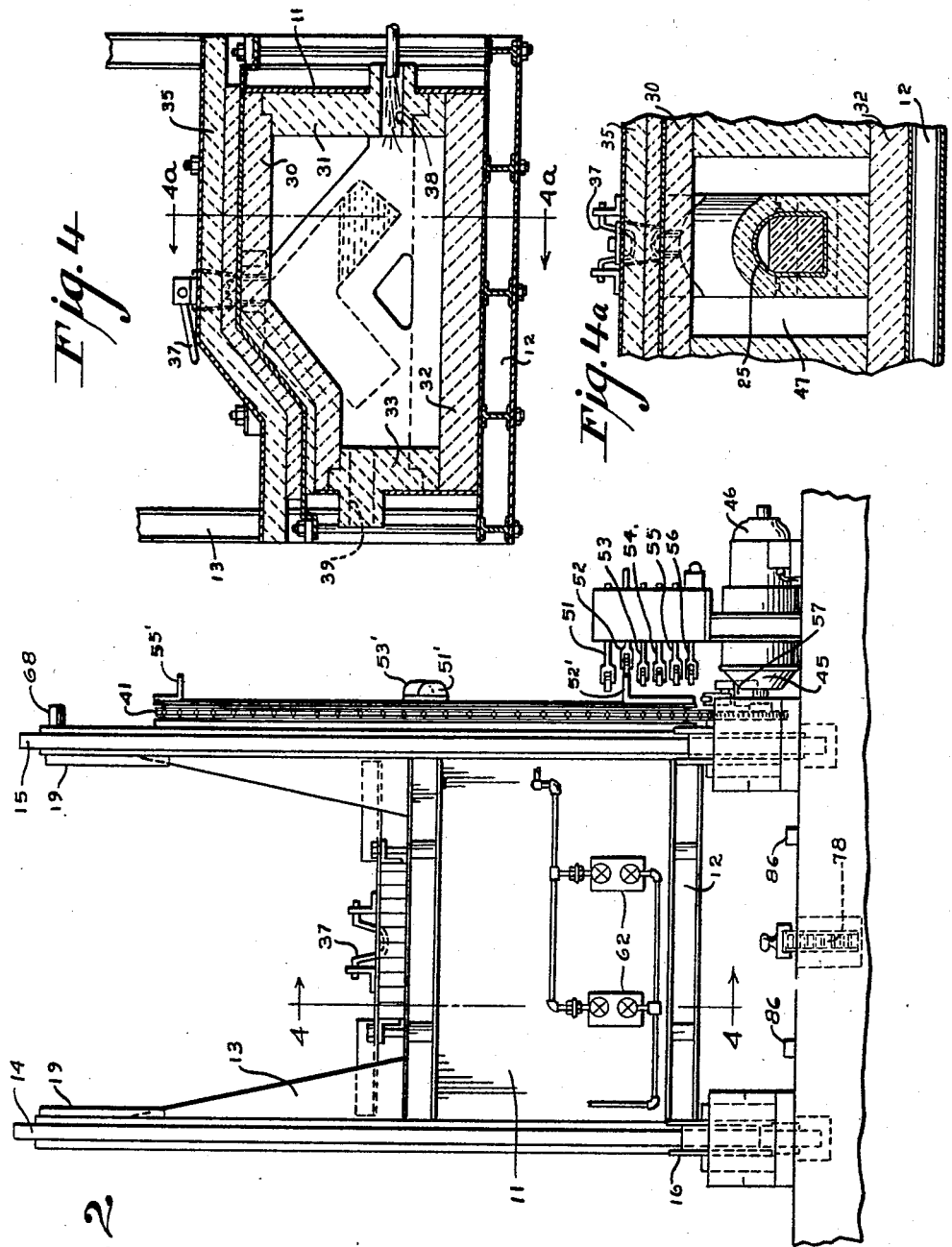

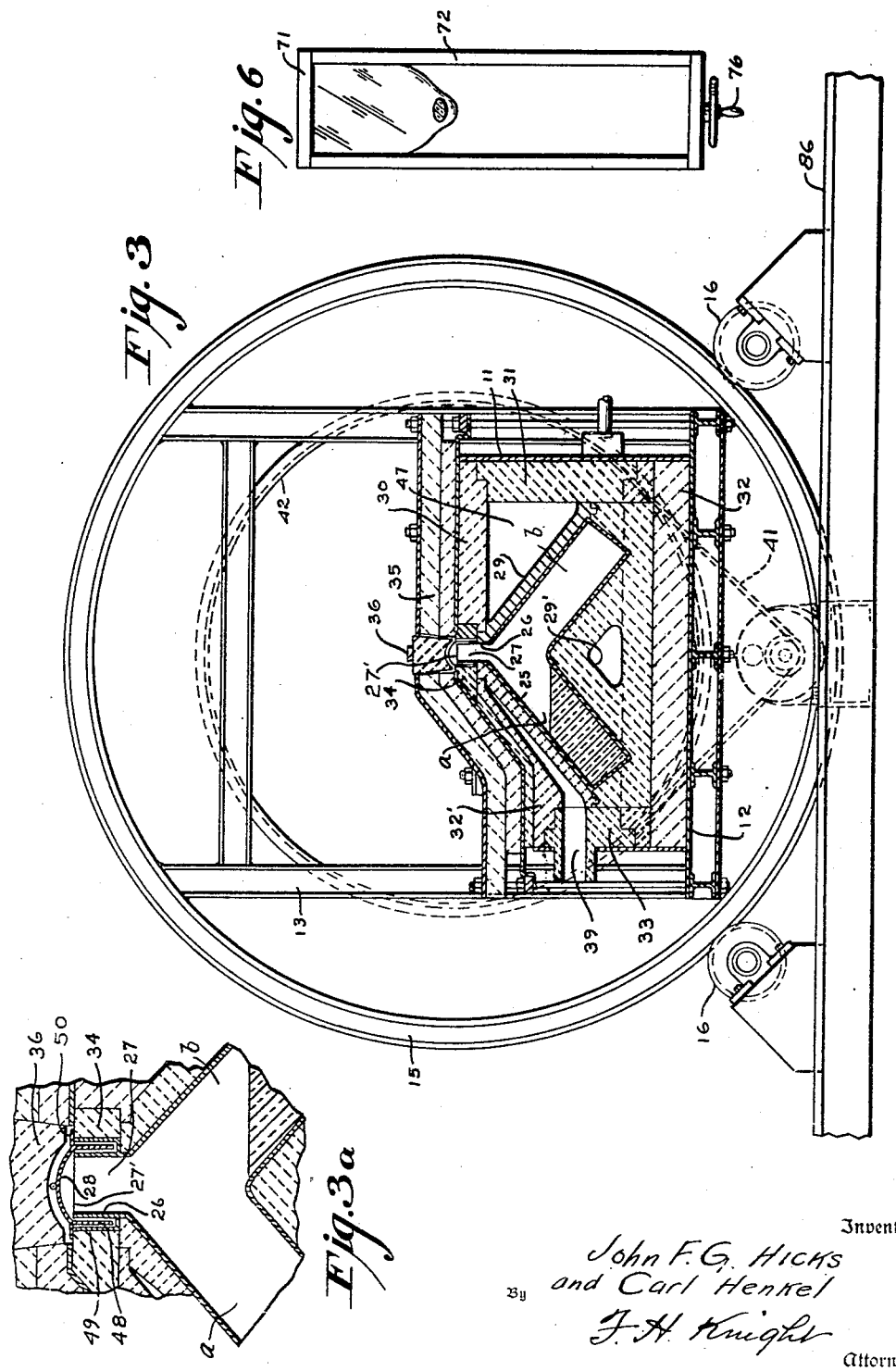

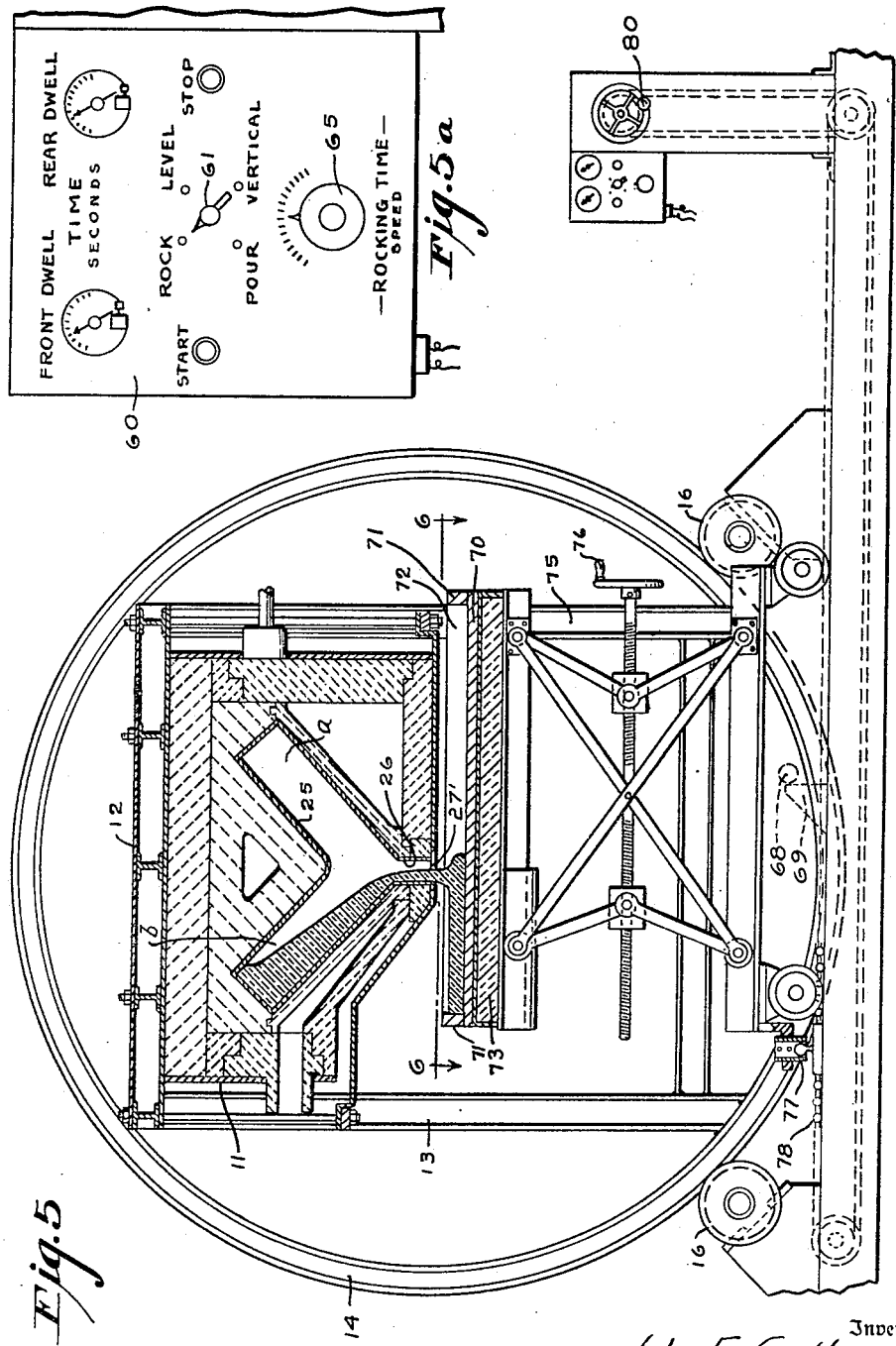

Patented Oct. 12, 1948

2,451,086

UNITED STATES PATENT OFFICE 2,451,086

APPARATUS FOR MELTING AND CASTING GLASS

John F. G. Hicks, Corning, and Carl F. Henkel, Big Flats, N. Y., assignors to Corning Glass Works, Corning, N. Y., a corporation of New York Original application December 5, 1941, Serial No. 421,794. Divided and this application November 8, 1943, Serial No. 509,462

5 Claims. (Cl. 49—39)

The present invention relates to an apparatus for making high quality glass and is a division of Hicks et al. application Serial Number 421,794, filed December 5, 1941, now abandoned.

An ever-present problem which the glassmaker faces is the melting of the batch in such a way that the resulting glass will have properties within certain restricted limits and the variations of said properties within these limits will be small throughout an individual portion of the glass. This latter portion, of course, must be of usable size. For example, an optical glass is specified as having $N_D = 1.5725 \pm 0.0010$ and $V = 57.4 \pm 0.3$. Thus $N_D$ may vary from 1.5715 to 1.4735 and $V$ from 57.1 to 57.7 from element to element in precision optical instruments, but it is evident that the variation of index and dispersion within a single piece of glass to be used as a unit element must be restricted to a much smaller range. The present invention relates to means which yield glass not only of highly homogeneous properties from one portion of the melt to another but, a fortiori, glass whose properties are more readily reproducible from melt to melt.

Although the present invention has been applied chiefly to the production of optical glasses where the requirements as to constancy of index and dispersion impose rigorous restrictions on the striae and bubble content of the glass, the apparatus is suitable for the production of any glass in which homogeneity and reproducibility of properties are governing factors. For example, glasses having a uniform and reproducible color or softness or electrical resistance, etc., could be produced with this apparatus and a more uniform product would result.

The chief factors contributing to a non-homogeneous glass resulting from the melting of a suitable adequately mixed batch are:

(1) Introduction of striae from pot solution.
(2) Inadequate mixing of the molten glass.
(3) Loss of volatile constituents during melting.

All three factors result in composition changes which in turn produce inhomogeneities in glass properties, manifested by striae.

When using an argillaceous refractory crucible some of the material of the crucible is dissolved into the melt and thereby changes the composition of those parts of the melt through which it is diffused. Thus different portions of every melt have different characteristics (individual to it) and each melt furnishes only a limited amount of glass of a predetermined optical quality. Even when utmost care is exercised in selecting pure batch materials and in avoiding introduction of contamination from the container, as by melting in a platinum crucible, striae are still found. These striae appear to result from an inevitable variation of composition at the surface of the melt from causes not fully known, but believed by applicants to be in part the result of volatilization of some of the constituents.

When the glass is cast in a conventional manner the surface layer is partially mixed with or folded into the body of the melt, producing striations. To avoid these striations it is the usual practice to let the melt cool in the crucible and then to crack the crucible, if composed of argillaceous material, or to cut the glass out of the crucible if the same is composed of metal. By the foregoing or similar methods the yield of glass of acceptable optical quality is a small percentage of the total melt.

The prime object of the present invention is an apparatus for melting glass capable of the consistent and repeated production of glass of uniform predetermined characteristics.

Applicants have discovered that glass of optical quality can be melted, fined and poured into slab form in such a manner that 80% to 90% of a melt will be of high optical quality and within the desired range of optical constants, if certain equipment is employed and certain novel processes are performed therewith.

In order consistently to produce these results it is preferable to remove all possible variable factors in the method which are inherent when the same is carried out manually and to this end equipment has been provided which can be made automatically to carry out the major portion of the steps of the method with precision.

This equipment as designed by applicants includes a glass batch melting container and facilities for so moving the container during the fining that the melt is caused to alternately assume short massive and elongated forms in such a manner that the glass at one end of each short mass always comprises for the most part glass from the opposite end of the preceding similar mass. By this method of working, the melt is thoroughly but gently mixed into a homogeneous mass of precision quality glass.

The equipment also embodies a container which has a cover which functions to minimize loss by volatilization in that it seals the container to the extent that it permits the vapors given off by the batch during melting to build up a positive pressure in the container but permits escape of vapors and gases before they develop bursting pressures within the container. On the other hand, the container and cover design are such that when the temperature of the melt is being reduced, as in the case preceding pouring, considerable negative pressures may develop within the container before permitting ingress of sufficient air to prevent the development of a negative pressure low enough to cause danger of the collapse of the container. In other words, the container and cover arrangement are such that breathing is reduced to a minimum, resulting in a minimum loss of the melt by volatilization.

The accompanying drawings illustrate mechanism including a melting and fining furnace assembly and associated mold equipment embodying the invention.

Fig. 1 is a side elevational view of the melting and fining furnace assembly and associated accessory equipment;

Fig. 2 is a rear view of the assembly;

Fig. 3 is a sectional elevation of the assembly;

Fig 3a is an enlarged view of a fragment of the structure shown in Fig. 3;

Fig. 4 is a sectional view taken on line 4–4 of Fig. 2.

Fig. 4a is a sectional view taken on line 4a–4a of Fig. 4;

Fig. 5 is a sectional view illustrating the pouring of a glass charge into a mold;

Fig. 5a is an enlarged view of a control panel appearing in small scale in Fig. 5; and Fig. 6 is a view taken on line 6–6 of Fig. 5.

In the drawings numeral 11 designated the furnace assembly which is clamped to a platform 12 of a frame 13. Frame 13 in turn forms a bridge between two circular tracks or rims 14 and 15, each supported by a pair of spaced flanged wheels 16 which enable ready turning of the rims 14 and 15 to rock the furnace 11 as required to thoroughly mix and fine glass contained therein and also as required to pour a batch therefrom.

By means of a series of angle irons 20 welded to rims 14 and 15 sheets of boiler plate such as 21, 22 and 23 are secured to the rims in a manner to in part compensate for the unbalancing effect of the furnace 11. Counter-balancing weights 19 are also employed to procure a better balance of the assembly.

The furnace 11 includes a melting container 25 having compartments a and b and having a neck-wall 26 terminating in an opening 27 bounded by a rim 27'. The container 25 may be composed of any highly refractory material considered most resistant to the action of the chemicals of the glass batch to be melted. In the present example it is assumed that the container 25 is composed of platinum. Opening 27 is provided with a cover 28 (Fig. 3a) of similar material to that of the container, although the cover may be composed of a platinum alloy to reduce danger of fusion to the container under certain conditions, as best depicted in Fig. 3a. Neck-wall 26 is surrounded by a wall 49 spaced therefrom to form a well into which a depending portion 48 of the cover projects almost to the bottom of the well. The cover 28 has a laterally extending flange 50 by means of which it is supported on the outer wall 49 of the well. The fit between the flange 39 and the inner wall 26 is fairly exact, and consequent to the pressure exerted resulting from the weight of the cover and a partial seal produced by condensation of vapors of the melt, breathing is materially restricted. By providing the well and the depending part 48 on cover 28 and introducing a small quantity of sealing glass in the well, the breathing action may be restricted.

The container 25 is incased in a shell assembly 29 of refractory material of good heat conducting characteristics and functioning to support the container against distortion of a glass batch contained therein. The shell 29 is supported on a refractory slab 32 of good thermal insulating qualities and is surrounded by refractory parts, such as 30–34, which form a muffle 47 about the incased container 25. Also, the lower section of shell 29 has a passage 29' the ends of which terminate in the muffle, as is clear from an inspection of Fig. 4a. The upper refractory units 30, 32' and 34 are prevented from rapidly conducting heat out of the furnace by a cover assembly 35 containing a plug 36 by means of which access may be had to the container 25 for filling without the necessity of removing such cover, and is provided with a bale 37 by means of which the cover assembly may be withdrawn from the furnace assembly 11 proper when glass is to be poured. The refractory unit 31 forming the back of the furnace 11 is provided with burner openings 38, whereas the refractory unit 33 forming the front end of the furance has a sting-out opening 39. Valved burner units 62 are associated with openings 38 and supply a suitable gas-air mixture to the muffle 47. As an alternative to combustion heating, electric heating units (not shown) may if desired be arranged within the muffle 47.

The assembly is actuated by a chain 41 anchored at the ends (Fig. 1a) in a ring 42 of channel iron arranged concentric to ring 15 and secured to frame 13. The chain 41 passes about a sprocket wheel 44 of a gear reduction unit 45 driven by a variable speed motor 46. Motor 46 is jointly controlled by a set of switches 51–57 (Fig. 2) adapted to be actuated by cams 51¹–57¹ carried by ring 42 and manually operated switches mounted on a control panel 60 (Fig. 5a). This panel has a switch 61 movable to positions labeled "Rock," "Level," "Vertical" and "Pour," respectively; a dial 65 which bears the label "Rocking time" and "Speed"; dials labeled "Front dwell" and "Rear dwell," respectively, and buttons labeled "Start" and "Stop," respectively. The equipment under the joint control of switches 51–57 and the control panel equipment is not considered a part of the present invention and has accordingly been omitted for the sake of avoiding unnecessary complication of the disclosure. The manner of operation, however, is briefly as follows:

In operation, switch 61 is turned to "Level" position and the start button momentarily actuated to cause motor 46 to operate and turn the furnace 11 to the level position (Fig. 1) where it will be brought to a stop through the control exercised by switch 52 upon its actuation by cam 52¹. While in this position the furnace is charged with a glass batch after the furnace has been preheated. With the furnace suitably preheated the plug 36 and cover 28 are removed and a measured quantity of glass batch or batch and cullet introduced into container 25 and the cover and plug replaced. The assembly is then allowed to remain stationary for sufficient time to allow the batch to acquire a viscous or flowable condition. Heating of the container is continued to produce a suitable temperature in the container both during melting and fining. The melting time period varies with the glass composition. At the termination of the proper period, switch 61 on panel 60 is moved to the "Rock" position and the "Start" button momentarily pressed to start motor 46 and place it under control of switches 54 and 56 and their actuating cams 54¹ and 56¹ under whose influence the direction of rotation of the motor will be periodically reversed so that rocking of the furnace will be effected. The switch 57 is for controlling auxiliary means for stopping motor 46 should the rocking movement continue after actuation of switch 54 or 56 a sufficient distance to bring cam 57¹ or 57² into operative relation with the switch 57. This safety device is inoperative except in case of failure of normal switching operation. Timing devices (not shown) under control of switches 54 and 56 are arranged to introduce a pause or dwell period at the termination of each rocking movement. The durations of the dwell periods are determined by the setting of the pointers of the dials labeled "Front dwell" and "Rear dwell" (Fig. 5a) which effect the required adjustments of the timing devices. The speed of travel of the furnace during its rocking movements is regulated by a rheostat (not shown) in the motor circuit whose control handle is shown at 65.

The foregoing apparatus and the method of operation above described have been found to produce a thoroughly mixed body of homogeneous glass in a minimum of time. The metal lining of the container does not dissolve in the glass to an appreciable extent or introduce deleterious material therein. The confined atmosphere in contact with the glass is of limited amount and by preventing its removal it quickly reaches equilibrium with the batch materials inhibiting further vaporization with its resultant variation of surface composition. The flow of glass from one arm of the container to the other over the line of juncture between the arms of the melting container produces a very thorough mixing of the various portions of the charge without entrapment of bubbles in the glass. Molten glass has the viscosity of thick syrup and the charge, starting as a compact mass in one part of the container, is elongated and materially reduced in cross section and then collected again as a compact mass in the other end of the container under the influence of the movement of the furnace. This working of the charge insures considerable mechanical displacement of the increments of the charge with respect to one another, promoting rapid solution of those portions of the charge of different composition in one another, thus producing a highly homogeneous mass. Since this mixting action takes place under conditions which do not simultaneously introduce further inhomogeneities into the glass, the mixing time is reduced to a minimum.

After the glass batch is thoroughly fined and ready for pouring it is desirable to accumulate the entire melt in the front leg of the container. This is accomplished by movement of switch 61 to its "Vertical" position. With the switch 61 in such position the operation of circuits for bringing the furnace 11 to a halt in its vertical position are placed under control of switches 51 and 53 actuated by cams 51¹ and 53¹ as the furnace approaches the vertical position. The charge is retained in this position for a short time to permit the escape of occluded bubbles, if any exist, and to permit final assimilation of glass which has been in contact with furnace atmosphere. In this position the charge has a minimum surface area exposed to atmosphere for further volatilization. Pouring of the melt is effected by turning switch 61 to the "Pour" position where it renders circuits under control of switch 55 and its cam 55¹ active to cause the furnace to be turned in a forward direction and to be brought to a stop in its inverted position (Fig. 5). The furnace is positively prevented from turning beyond the inverted position by suitable stops 68 and 69. Cover assembly 35 is removed when the furnace is in the level position, immediately before the furnace assembly is set in "Vertical" and lid 28 is removed at the "Vertical" position just prior to the furnace attaining the "Pour" position.

Equipment for the receipt of the glass issuing from container 25 is illustrated in Fig. 5. This equipment includes a mold 70 having removable ends 71 and removable sides 72 to facilitate ready removal of a glass slab therefrom. The mold 70 rests on a slab 73 of insulating material to prevent too rapid heat loss of the glass through the highly heat conductive mold bottom. The slab 73 is supported on a carriage 75 movable over a track 66 passing under the furnace 11. The height of carriage 75 is rendered adjustable by a crank 76 and is so regulated that with the furnace 11 in vertical position the top edge of the mold 70 can be oriented adjacent and just clear of the container outlet 27. To pour the glass into the mold without folding the stream and thus mixing the surface layer with the body of glass of the melt, the mold is moved leftward as the furnace is being turned clockwise to the inverted position. By carefully synchronizing the movement of the carriage 75 with that of the furnace, the contents of the container 25 can be flowed along the length of the mold surface without mixing the surface layer with the body of glass of the melt and with the flattening and/or stretching of the stream transversely of the mold as pouring proceeds, as illustrated in Fig. 6. In order to readily enable the movement of the carriage in the aforesaid fashion, a carriage drive chain 78 is provided. This chain is coupled to carriage 75 at 77 and, by means of a crank 80 adjacent control panel 60, may be readily moved to draw the carriage under the furnace at the speed which an observing operator deems most suitable for the viscosity of the glass being poured. As soon as the glass has been poured the carriage is withdrawn and the cast slab of glass quickly transferred to a suitable annealing oven.

Although in the foregoing there has been shown and described the preferred embodiment of our invention, it is to be understood that minor changes in the details of construction and combination of parts may be resorted to without departing from the spirit and scope of our invention as claimed.

We claim:

1. In a glass melting and fining apparatus, a glass melting and fining container having two mouthed compartments in opposing mouth to mouth relation and connected to one another by their mouths and their mouths communicating with a medial aperture to atmosphere, and a circular support to which said container is fixed with the aperture thereof on the axis of said support whereby by the turning of said support about its axis the aperture can be brought into position to pour glass from the container while the initial height of the center of the aperture relative to a receiving vessel remains the same throughout the turning movement.

2. In a glass melting and fining apparatus, a glass melting and fining container having two mouthed compartments in opposing mouth to mouth relation and connected to one another by their mouths and their mouths communicating with a medial aperture to atmosphere, a support to which said container is fixed and arranged for turning movement about a fixed axis, said container being so positioned that the rim of its aperture is approximately in the axis of said support, a track arranged beneath said container in a horizontal plane at right angles to the axis of said support, and a mold equipped carriage arranged on said track with the top of the mold in a plane below that of the axis of said support.

3. In a furnace structure a melting container composed of highly refractory material and having two compartments widely spaced at the bottom ends and joined to a common neck opening at their top ends, a highly refractory cover for the container opening, a shell of highly refractory material encasing said container, a structure of refractory material surrounding and for the most part spaced from said shell having a removable part arranged over the neck opening and having burner ports opening into the space surrounding said shell, and burners for directing flames into such ports to heat the container to melt a glass batch therein.

4. In a glass melting furnace, a Y-shaped hollow container of highly refractory material having a single opening at the base of the Y, muffle means surrounding said container, means for heating the interior of said muffle, and a movable support for said container and muffle, said support being mounted for movement about a horizontal axis in a plane parallel to the arms of said container, the axis of said support being substantially in the plane of the opening of said container.

5. In a glass melting furnace a pair of generally disc shaped bodies mounted for movement about a horizontal axis passing through their geometric centers, a platform secured between said bodies, a refractory container and means for heating the same secured to said platform, said container being a hollow body having a discharge opening in one portion of its surface, said opening being in a plane including the axis of said bodies.

JOHN F. G. HICKS.
CARL F. HENKEL.

REFERENCES CITED

The following references are of record in the file of this patent:

UNITED STATES PATENTS

| Number | Name | Date |
| --- | --- | --- |
| 305,376 | Del Marmol | Sept. 16, 1884 |
| 698,980 | Lohme | Apr. 29, 1902 |
| 708,113 | Baldwin et al. | Sept. 2, 1902 |
| 708,782 | Schwartz | Sept. 9, 1902 |
| 749,403 | Rousseau | Jan. 12, 1904 |
| 770,832 | Taylor | Sept. 27, 1904 |
| 961,182 | Vining | June 14, 1910 |
| 1,059,634 | Proeger | Apr. 22, 1913 |
| 1,201,225 | Gillett | Oct. 10, 1916 |
| 1,827,469 | Harrington | Oct. 13, 1931 |
| 2,039,853 | Stenhouse | May 5, 1936 |
| 2,223,047 | Ramseyer | Nov. 26, 1940 |
| 2,286,903 | Dockerty | June 16, 1942 |